US 6,564,981 B2

United States Patent
Murphy

(10) Patent No.: US 6,564,981 B2
(45) Date of Patent: May 20, 2003

(54) REARVIEW MIRROR CLIPBOARD

(76) Inventor: Michael P. Murphy, Box 127, Cheektowaga, NY (US) 14225

(*) Notice: Subject to any disclaimer, the term of this patent is extended or adjusted under 35 U.S.C. 154(b) by 0 days.

(21) Appl. No.: 09/796,222

(22) Filed: Feb. 28, 2001

(65) Prior Publication Data
US 2002/0117522 A1 Aug. 29, 2002

(51) Int. Cl.$^7$ ................................................ B60R 7/00
(52) U.S. Cl. ......................... 224/277; 40/643; 40/651; 40/666; 40/593; D12/188; D12/415; D19/88
(58) Field of Search ................................ 224/277, 276; D12/415, 417, 418, 188, 187; D19/88; 296/37.1; 40/301, 316, 643, 645, 651, 666, 667, 593, 492, 606; 248/292.13

(56) References Cited

U.S. PATENT DOCUMENTS

| | | | | |
|---|---|---|---|---|
| 1,865,241 A | * | 6/1932 | Dock | 224/276 |
| 1,974,661 A | * | 9/1934 | Singer | 224/277 |
| 2,150,709 A | | 3/1939 | Bake | |
| 2,605,566 A | * | 8/1952 | De Dell, Jr. | 40/316 |
| 2,847,774 A | * | 8/1958 | Brooks | 40/666 |
| 2,990,637 A | * | 7/1961 | Saben | 224/277 |
| 3,083,427 A | * | 4/1963 | Grenon | 24/343 |
| D234,592 S | * | 3/1975 | Callaway | D12/188 |
| 3,884,443 A | * | 5/1975 | McMaster | 24/67 AR |
| 4,379,372 A | * | 4/1983 | Alexander et al. | 40/316 |
| 4,445,728 A | | 5/1984 | Bratton | |
| 4,962,874 A | * | 10/1990 | Hagglund | 16/225 |
| 4,974,805 A | | 12/1990 | Douglas | |
| D313,629 S | * | 1/1991 | Hoffman | D19/86 |
| 5,253,943 A | | 10/1993 | Miyashita | |
| 5,294,032 A | * | 3/1994 | Hagglund | 224/277 |
| 5,328,137 A | * | 7/1994 | Miller et al. | 248/205.3 |
| D349,731 S | * | 8/1994 | Leveen et al. | D19/35 |
| 5,489,121 A | | 2/1996 | Mohr | |
| 5,598,653 A | * | 2/1997 | Schaefer | 248/292.13 |
| 5,823,500 A | | 10/1998 | La Coste | |
| 5,887,902 A | | 3/1999 | Irwin et al. | |
| 5,906,448 A | | 5/1999 | Najmi | |
| 6,095,477 A | | 8/2000 | Pohlman | |
| 6,095,915 A | * | 8/2000 | Geissler et al. | 40/301 |

* cited by examiner

*Primary Examiner*—Stephen K. Cronin
(74) *Attorney, Agent, or Firm*—The Bilicki Law Firm P.C.

(57) ABSTRACT

Car shows are a hobby of ever increasing popularity. During car show competitions or exhibition and information card is required to be displayed. The present invention shows a device for the display of information cards in a stylish way without detracting from the overall look of the car. The device is a modified clipboard to hang from the rearview mirror of a car. The rearview mirror clipboard is made of clear rigid, with a center hole and channel to accommodate the arm of the rearview mirror.

22 Claims, 2 Drawing Sheets

REARVIEW MIRROR CLIPBOARD

FIELD OF THE INVENTION

This invention relates to clipboards and hanging devices. In particular, this invention relates to devices for displaying information from vehicle rearview mirrors during car shows and other events.

BACKGROUND OF THE INVENTION

Most conventional clipboards are designed with a rectangular planar surface about the size of a standard sheet of paper. A clip is attached at the center top edge of the board for holding the sheet of paper in place while writing or drawing. The main function of a clipboard is to hold a piece of paper securely while moving or when a desk is not available.

Some clipboards have been used in connection with motor vehicles. For example, U.S. Pat. No. 2,150,709 to Bake discloses a clipboard that engages the steering wheel of a vehicle. Modifications and improvement to this invention can be found in U.S. Pat. No. 4,974,805 to Douglas and U.S. Pat. No. 5,489,121 to Mohr. The Douglas invention teaches a clipboard that mounts on the steering wheel of a vehicle or a boat using a slot for receiving a top section of the steering wheel, a bottom flange for engaging the lower section of the steering wheel and a clip on the upper center of the board for holding pieces of paper. The Mohr patent discloses a device with a binder for holding paper in place that is mounted to the steering wheel of a golf cart.

U.S. Pat. No. 5,253,943 to Miyashita discloses a plastic clipboard with elastic engaging pins for holding sheets of instructions. A flat rectangular plastic material bent longitudinally into an inverted U shape forms the clipboard. A hook is permanently attached to the curved section of the U.

U.S. Pat. No. 6,095,477 to Pohlman teaches a clipboard that can be suspended or mounted on the door window of a vehicle. The writing surface of the clipboard is located within the vehicle interior. The invention also presents a pouch for storage, which is positioned on the exterior of the vehicle window.

Many other clipboard modifications such as a clipboard for outdoor use (U.S. Pat. No. 5,887,902 to Irwin, et. al.), for use in all weather conditions (U.S. Pat. No. 4,445,728 to Bratton), with additional functions such as a hole punch-clipboard combination (U.S. Pat. No. 5,906,448 to Najmi), and clipboard-clock-calculator combination (U.S. Pat. No. 5,823,500 to LaCoste) are present in the prior art. All the clipboards in the prior art have in common a rectilinear design, a clip or other paper holding device near the edge, and a preponderance of the flat area of the board available as a writing surface. If the user desires to hang the clipboard, an additional hanging device(s) such as hooks, straps or additional boards are incorporated into the clipboard design.

There are also in the prior art hanging devices for vehicles, for example hanging parking tags and handicapped parking permits. These devices are made of flexible, colored plastic or vinyl and display a desired set of printed information. However, if someone wants to display a temporary sign or information card, a neat and clear way of accomplishing this is not available in the prior art.

Car shows are a hobby of ever increasing popularity. During car shows, an information card must be displayed at the front of the vehicle. Most competitors place the card under the windshield or tape it to the windshield. These methods are sufficient but not desirable since tape marks can be difficult to clean from an otherwise flawlessly detailed car and the winds and elements can mar the card being held under the windshield wipers. In addition, other competitors can easily remove such cards when they are displayed on the exterior of a vehicle.

Preprinted hanging devices for the cars cannot vary the information printed on them or display different papers or cards. Regular clipboards are big, bulky and if utilized to present information, possess extra elements such as hooks or straps that detract from the look of the show vehicle and the information desired to be presented. The present invention solves the need in the prior art for a device able to display information, such as information cards for car shows, in a neat and stylish manner from the rearview mirror of a car without detracting from the overall look of the car being shown in competition.

SUMMARY OF THE INVENTION

The present invention seeks to solve the need for a device for displaying information cards during car show competitions from the rearview mirror of a vehicle without detracting from the overall look of the vehicle. The present invention is a square piece of rigid, transparent material, for example hardened liquid acrylics, with a center, circular hole and a channel sized to fit all car rearview mirror arms. A clip located under the center, circular hole provides a means to temporarily affix papers or information cards during car shows or competitions. The dimensions of the center, circular hole and channel allow for the fitting of the invention over different rearview mirror attachment arms and also for the stable hanging of the clipboard with information cards of different sizes and shape.

DETAILED DESCRIPTION OF THE INVENTION

Figure 1:
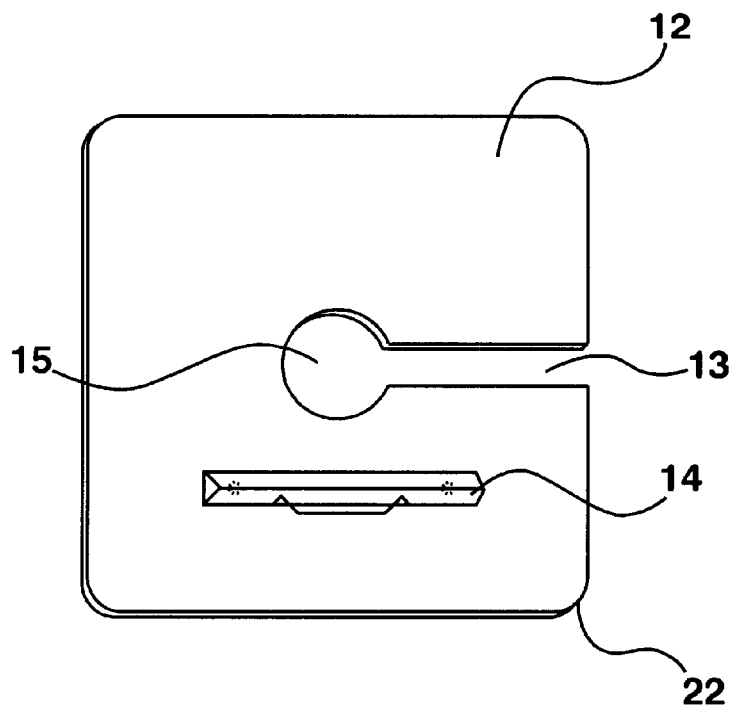
FIG. 1 is a perspective front view of the preferred embodiment of the invention.
Figure 2:
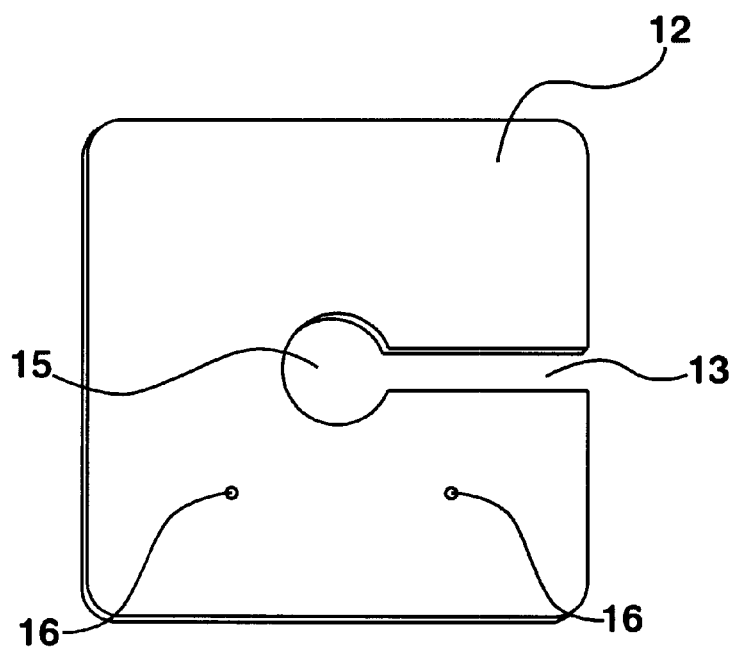
FIG. 2 is a perspective front view of the preferred embodiment of the invention without the clip.

FIG. 1 shows a perspective front view of the rearview mirror clipboard. As shown in FIG. 1, the rearview mirror clipboard comprises board 12 and clip 14. FIG. 2 illustrates board 12 without clip 14. Board 12 is constructed of a piece of substantially rigid and transparent material, for example hardened liquid acrylics such as Plexiglas™. In a preferred embodiment, board 12 will be flat and generally rectilinear. In a more preferred embodiment, board 12 will be a square with four edges approximately 13.3 cm (5 ¼ inches) long and board 12 will be 0.32 cm (⅛ inch) thick.

Circular hole 15, with a diameter ranging from 1.25 cm (0.5 inches) to 3.80 cm (1.5 inches), is drilled in the center of board 12. Clip 14 is attached to board 12 below and centered on circular hole 15. In the preferred embodiment shown in FIG. 1, clip 14 is fixedly attached to board 12 by rivets. As seen in FIG. 2, two small holes 16 are also drilled through board 12 for accommodating the rivets holding clip 14 to board 12. It is recognized that other attachment methods are possible such as nuts and bolts, tape, and adhesives where holes 16 may not be required.

Channel 13, approximately 1.8 cm. to 2.0 cm (0.625 inches to 0.75 inches), extends from a side edge of board 12 and opens into circular hole 15. In a preferred embodiment, the four corners of board 12 are sanded to eliminate sharp edges from the clipboard. Methods of drilling and cutting plastics and similar material are well known to those skilled in the art.

Figure 3:
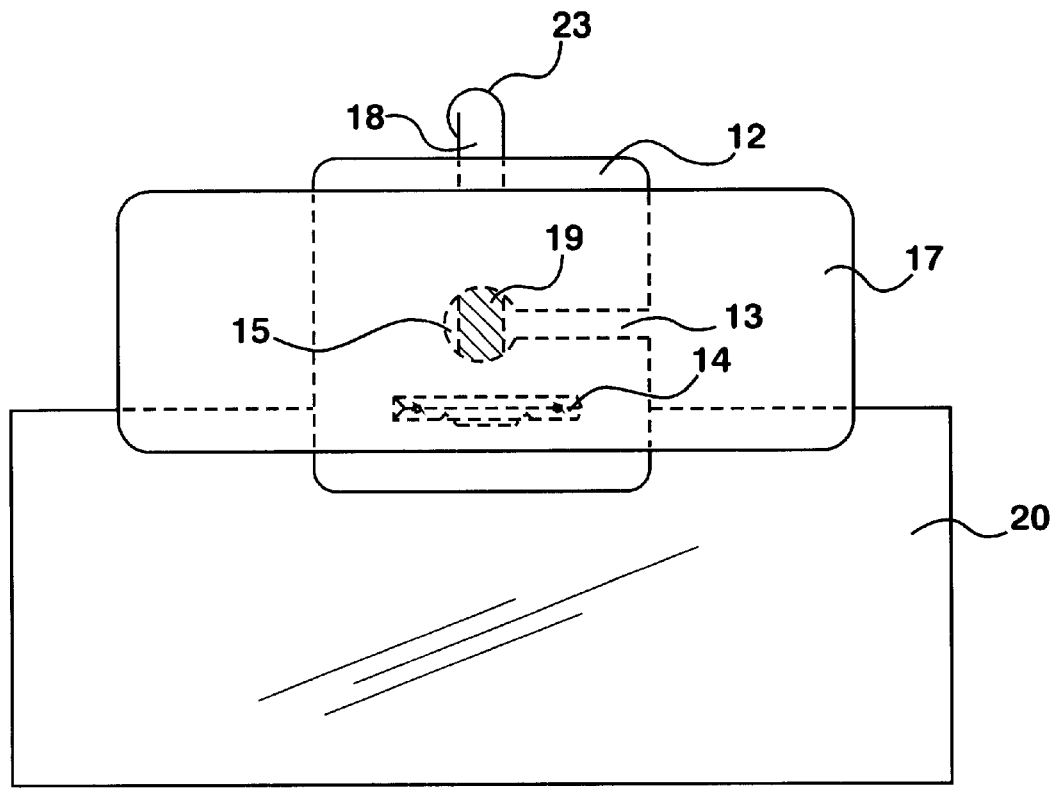
FIG. 3 is a front view of the preferred embodiment hanging from the rear view mirror of a car.

FIG. 3 shows a front view of the preferred embodiment while hanging from rearview mirror 17 of a vehicle. Rearview mirror 17 has an attachment arm 18 with one end 23 attached to the windshield of the car and a second end (not shown) attached to rearview mirror 17. Channel 13 fits around attachment arm 18 and acts to guide the clipboard along attachment arm 18 to circular hole 15. The clipboard is balanced so that circular hole 15 rests on attachment arm 18 against the second end of attachment arm 18 and rearview mirror 17. It should be noted that clip 14 is hidden by rearview mirror 17, allowing for the display of information card 20 in a neat way. It is recognized that attachment arm 18 may extend from the molding framing the windshield, the vehicle roof or vehicle dashboard.

Figure 4:
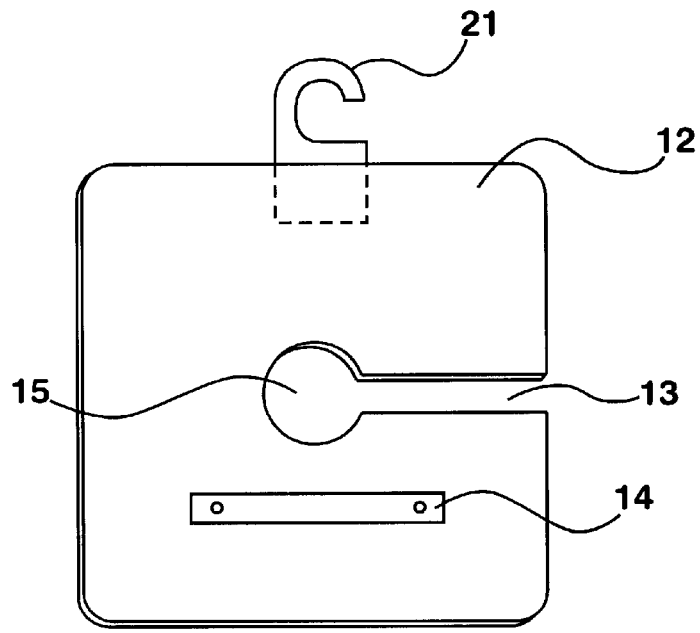
FIG. 4 is a perspective front view of an alternative embodiment of the invention.

Classic cars or exhibition cars are sometimes modified by the owners to make them more stylish. A typical modification is to lower the roof of the show car. This creates a low clearance problem for the use of the rearview mirror clipboard. In an alternative embodiment as shown in FIG. 4, the owner can attach an adhesive hanging tab 21 at the center top edge of board 12. Hanging tab 21 allows the clipboard to hang from the rearview mirror, allowing the display of information cards even with a low vehicle roof design.

While the present invention has been described with respect to what is presently considered to be the preferred embodiments, it is understood that the invention is not limited to the disclosed embodiments. The present invention is intended to cover various modifications and equivalent arrangements included within the spirit and scope of the appended claims.

What is claimed is:

1. A vehicular rearview mirror clipboard comprising:
   a flat and generally rectilinear board constructed of a substantially rigid and transparent material;
   said board defining a circular hole at the center of said board, said circular hole having a diameter of about 1.25 cm to about 3.8 cm;
   a channel extending from a side edge of said board to said circular hole; and
   a clip fixedly attached to said board and generally located below said circular hole.

2. A vehicular rearview mirror clipboard according to claim 1 further comprising an information card attached by said clip.

3. A vehicular rearview mirror clipboard according to claim 1 wherein the four corners of said board are sanded.

4. A vehicular rearview mirror clipboard according to claim 1 further comprising a transparent, adhesive hanging tab.

5. A vehicular rearview mirror clipboard according to claim 1 wherein said clip is fixedly attached to said board with rivets.

6. A vehicular rearview mirror clipboard according to claim 1 wherein said clip is fixedly attached to said board with adhesive.

7. A vehicular rearview mirror clipboard according to claim 1 wherein said clip is fixedly attached to said board with a nut and a bolt.

8. A vehicular rearview mirror clipboard according to claim 1 wherein said board is square.

9. A vehicular rearview mirror clipboard according to claim 1 wherein said board comprises four edges and each edge is approximately 13.3 cm in length.

10. A vehicular rearview mirror clipboard according to claim 1 wherein said board is approximately 0.32 cm thick.

11. A method of displaying an information card from inside a vehicle, comprising:
    attaching the information card to a clip fixedly attached to a clipboard;
    placing a channel that extends from an edge of said clipboard around an attachment arm of a rearview mirror;
    guiding said clipboard along said attachment arm to a circular hole in the center of said clipboard, and
    balancing said clipboard on said attachment arm.

12. A vehicular rearview mirror clipboard comprising:
    a generally rectilinear board;
    said board defining an opening adapted to receive an attachment arm of a rearview mirror;
    a channel extending from a side edge of said board to said opening; and
    a clip fixedly attached to said board and generally located below said opening.

13. A vehicular rearview mirror clipboard according to claim 12 wherein said opening is located at the center of said board.

14. A vehicular rearview mirror clipboard according to claim 12 further comprising an information card attached by said clip.

15. A vehicular rearview mirror clipboard according to claim 12 wherein the edges of said board are sanded.

16. A vehicular rearview mirror clipboard according to claim 12 further comprising an adhesive hanging tab.

17. A vehicular rearview mirror clipboard according to claim 12 wherein said board is square.

18. A vehicular rearview mirror clipboard according to claim 12 wherein said board comprises four edges and each edge is approximately 13.3 cm in length.

19. A vehicular rearview mirror clipboard according to claim 12 wherein said board is approximately 0.32 cm thick.

20. A vehicular rearview mirror clipboard according to claim 12 wherein said opening is circular.

21. A vehicular rearview mirror clipboard according to claim 20 wherein said opening has a diameter of about 1.25 cm to about 3.8 cm.

22. A method of displaying an information card from inside a vehicle, comprising:
    attaching the information card to a clip fixedly attached to a clipboard, said clipboard comprising an opening adapted to receive an attachment arm of a rearview mirror and a channel extending from said opening to a side edge of said clipboard; and
    positioning said clipboard by sliding said channel over said attachment arm, such that said attachment arm is received in said opening.

* * * * *